United States Patent
Liszewski et al.

(10) Patent No.: US 10,789,550 B2
(45) Date of Patent: Sep. 29, 2020

(54) SYSTEM AND METHOD FOR GENERATING TEST VECTORS

(71) Applicant: Battelle Memorial Institute, Columbus, OH (US)

(72) Inventors: Katie T. Liszewski, Powell, OH (US); Matthew C. Brewer, Columbus, OH (US)

(73) Assignee: Battelle Memorial Institute, Columbus, OH (US)

(*) Notice: Subject to any disclaimer, the term of this patent is extended or adjusted under 35 U.S.C. 154(b) by 0 days.

(21) Appl. No.: 15/952,626

(22) Filed: Apr. 13, 2018

(65) Prior Publication Data

US 2018/0307654 A1    Oct. 25, 2018

Related U.S. Application Data

(60) Provisional application No. 62/485,331, filed on Apr. 13, 2017.

(51) Int. Cl.
*G06N 20/00*    (2019.01)
*G06K 9/00*     (2006.01)
(Continued)

(52) U.S. Cl.
CPC ............. *G06N 20/00* (2019.01); *G01R 31/26* (2013.01); *G01R 31/2894* (2013.01); *G06F 15/76* (2013.01); *G06F 21/44* (2013.01); *G06K 9/00536* (2013.01); *G06K 9/00577* (2013.01); *G06K 9/6269* (2013.01); *G06N 7/005* (2013.01); *G06N 20/10* (2019.01)

(58) Field of Classification Search
CPC ......... G06F 15/18; G06F 21/44; G01R 31/26; G06K 9/00536; G06K 9/6269
USPC ......................................................... 702/108
See application file for complete search history.

(56) References Cited

U.S. PATENT DOCUMENTS 5,218,294 A    6/1993    Soiferman
5,428,683 A    6/1995    Indeck et al.
(Continued)

FOREIGN PATENT DOCUMENTS

CN    104267218 A  *  1/2015
EP    1 099 197        5/2001
(Continued)

OTHER PUBLICATIONS

Ren and et al, "Methodology of Testability Design of Electronic Components Based on the Boundary-Scan Method", 2010 11th International Conference on Electronic Packaging Technology & High Density Packaging 978-1-4244-8142-2/10/$26.00 © 2010 IEEE (Year: 2010).*

(Continued)

*Primary Examiner* — Alexander Satanovsky
*Assistant Examiner* — Douglas Kay
(74) *Attorney, Agent, or Firm* — Warner Norcross + Judd LLP

(57) ABSTRACT

A system and method for selecting a test vector for use in classification of electronic components. The system and method can quickly and automatically select a test vector that, when applied to a set of training electronic components, causes the electronic components to produce side channel information that can be used to build a classifier that accurately classifies a set of test electronic components.

29 Claims, 10 Drawing Sheets

(51) Int. Cl.
*G01R 31/26* (2020.01)
*G06F 21/44* (2013.01)
*G06K 9/62* (2006.01)
*G06F 15/76* (2006.01)
*G01R 31/28* (2006.01)
*G06N 7/00* (2006.01)
*G06N 20/10* (2019.01)

(56) References Cited

U.S. PATENT DOCUMENTS

| | | |
|---|---|---|
| 5,546,462 A | 8/1996 | Indeck et al. |
| 5,625,689 A | 4/1997 | Indeck et al. |
| 5,740,244 A | 4/1998 | Indeck et al. |
| 5,802,208 A * | 9/1998 | Podilchuk ............ G06K 9/00221 382/115 |
| 6,161,213 A | 12/2000 | Lofstrom |
| 6,728,653 B1 * | 4/2004 | Figueredo ............ G01R 31/2853 324/703 |
| 6,760,715 B1 * | 7/2004 | Barnhill ............ G06F 19/24 706/12 |
| 6,925,709 B1 * | 8/2005 | Howell ............ H05K 13/0417 29/740 |
| 7,017,048 B2 | 3/2006 | Schneider et al. |
| 7,188,258 B1 * | 3/2007 | Aggarwal ............ H04L 9/3247 235/487 |
| 7,210,634 B2 | 5/2007 | Sapiro |
| 7,412,342 B2 * | 8/2008 | Sturges ............ G01R 31/318516 702/117 |
| 7,617,468 B2 * | 11/2009 | Thakur ............ G06F 17/5081 703/14 |
| 7,757,083 B2 | 7/2010 | Devadas et al. |
| 7,827,413 B2 | 11/2010 | Liardet et al. |
| 7,840,803 B2 | 11/2010 | Clarke et al. |
| 7,904,731 B2 | 3/2011 | Devadas et al. |
| 8,069,490 B2 | 11/2011 | Gross et al. |
| 8,139,846 B2 | 3/2012 | Bajura et al. |
| 8,274,306 B1 | 9/2012 | Garcia |
| 8,341,759 B2 | 12/2012 | Gross et al. |
| 8,384,415 B2 | 2/2013 | Lewis |
| 8,386,801 B2 | 2/2013 | Devadas et al. |
| 8,476,920 B2 | 7/2013 | Brown et al. |
| 8,516,269 B1 | 8/2013 | Hamlet et al. |
| 8,610,454 B2 | 12/2013 | Plusquellic et al. |
| 8,667,265 B1 | 3/2014 | Hamlet et al. |
| 8,782,396 B2 | 7/2014 | Ziola et al. |
| 8,825,823 B2 | 9/2014 | Keller, III |
| 8,848,905 B1 | 9/2014 | Hamlet et al. |
| 8,868,923 B1 | 10/2014 | Hamlet et al. |
| 8,874,926 B1 | 10/2014 | Edwards et al. |
| 8,950,008 B2 | 2/2015 | Fainstein et al. |
| 9,018,972 B1 | 4/2015 | Gurrieri et al. |
| 9,036,891 B2 | 5/2015 | Cobb et al. |
| 9,059,189 B2 | 6/2015 | Keller, III et al. |
| 9,071,446 B2 | 6/2015 | Kreft |
| 9,121,873 B2 | 9/2015 | Satoh et al. |
| 9,129,671 B2 | 9/2015 | Salters et al. |
| 9,188,622 B1 | 11/2015 | Tangyunyong et al. |
| 9,189,747 B2 * | 11/2015 | Mann ............ G06N 5/04 |
| 9,208,355 B1 | 12/2015 | Areno |
| 9,262,632 B2 | 2/2016 | Reed et al. |
| 9,268,938 B1 * | 2/2016 | Aguayo Gonzalez ............ G01R 21/00 |
| 9,411,009 B1 * | 8/2016 | Aguayo Gonzalez ............ G01R 21/00 |
| 9,430,644 B2 | 8/2016 | Aguayo Gonzalez et al. |
| 9,443,298 B2 | 9/2016 | Ross et al. |
| 9,558,349 B2 | 1/2017 | Reed et al. |
| 9,582,714 B2 | 2/2017 | Ross et al. |
| 9,589,155 B2 | 3/2017 | Poornachandran et al. |
| 9,759,757 B2 * | 9/2017 | House ............ G06K 9/6276 |
| 9,767,459 B1 * | 9/2017 | Teplinsky ............ G06Q 30/0185 |
| 9,886,583 B2 | 2/2018 | Aguayo Gonzalez et al. |
| 9,887,721 B2 | 2/2018 | Keller, III et al. |
| 10,054,624 B2 * | 8/2018 | House ............ G06K 9/6276 |
| 10,068,176 B2 * | 9/2018 | Chan ............ G06N 5/04 |
| 10,157,278 B2 * | 12/2018 | Aguayo Gonzalez ............ G01R 21/00 |
| 2002/0002326 A1 * | 1/2002 | Causey, III ............ A61B 5/0002 600/300 |
| 2002/0091979 A1 * | 7/2002 | Cooke ............ G01R 31/318342 714/733 |
| 2003/0016038 A1 * | 1/2003 | Frankowsky ............ G01R 1/0483 324/750.25 |
| 2003/0052395 A1 | 3/2003 | Nakamura et al. |
| 2004/0086097 A1 * | 5/2004 | Olafsson ............ H04L 5/1438 379/93.32 |
| 2004/0102914 A1 * | 5/2004 | More ............ G01K 3/14 702/99 |
| 2006/0085155 A1 * | 4/2006 | Miguelanez ............ G01R 31/2836 702/118 |
| 2006/0112043 A1 * | 5/2006 | Oliver ............ G06K 9/6297 706/20 |
| 2007/0027643 A1 | 2/2007 | Lesesky et al. |
| 2007/0164729 A1 * | 7/2007 | Cowburn ............ G01R 31/2896 324/759.02 |
| 2007/0234058 A1 | 10/2007 | White |
| 2007/0270721 A1 * | 11/2007 | Ananny ............ A63B 24/0062 600/595 |
| 2008/0025591 A1 * | 1/2008 | Bhanot ............ G06K 9/00536 382/132 |
| 2008/0033682 A1 * | 2/2008 | Blancha ............ G01R 31/2834 702/108 |
| 2008/0094273 A1 * | 4/2008 | Doyen ............ G01N 22/00 342/22 |
| 2009/0012737 A1 * | 1/2009 | Coss, Jr. ............ G01M 99/00 702/108 |
| 2009/0037858 A1 * | 2/2009 | Thakur ............ G01R 31/31835 716/106 |
| 2009/0099830 A1 * | 4/2009 | Gross ............ G01R 31/2813 703/14 |
| 2010/0063948 A1 * | 3/2010 | Virkar ............ G06N 99/005 706/12 |
| 2010/0241864 A1 | 9/2010 | Kelley et al. |
| 2012/0223403 A1 | 9/2012 | Keller, III et al. |
| 2012/0226463 A1 | 9/2012 | Keller, III et al. |
| 2013/0108145 A1 | 5/2013 | Cobb et al. |
| 2013/0127442 A1 | 5/2013 | Satoh et al. |
| 2013/0185314 A1 * | 7/2013 | Rubinstein ............ G06F 17/30542 707/749 |
| 2013/0189953 A1 * | 7/2013 | Mathews ............ H04W 12/06 455/411 |
| 2013/0271170 A1 * | 10/2013 | Barabi ............ G01R 31/26 324/750.08 |
| 2014/0258156 A1 | 9/2014 | Tziazas et al. |
| 2014/0293091 A1 * | 10/2014 | Rhoads ............ G01J 3/513 348/234 |
| 2014/0351285 A1 * | 11/2014 | Liu ............ G06Q 50/06 707/770 |
| 2015/0046715 A1 | 2/2015 | Ignatchenko |
| 2015/0052364 A1 | 2/2015 | Edwards et al. |
| 2015/0112903 A1 * | 4/2015 | Chan ............ G06N 5/04 706/12 |
| 2015/0186795 A1 * | 7/2015 | Chandra ............ G06N 99/005 706/12 |
| 2015/0219714 A1 | 8/2015 | Hamilton et al. |
| 2015/0262038 A1 * | 9/2015 | Konuru ............ G06T 7/0004 382/149 |
| 2015/0317475 A1 * | 11/2015 | Aguayo Gonzalez .. G06F 21/55 726/23 |
| 2016/0078361 A1 * | 3/2016 | Brueckner ............ G06N 99/005 706/12 |
| 2016/0112083 A1 | 4/2016 | Keller, III et al. |
| 2016/0117502 A1 | 4/2016 | Reed et al. |
| 2016/0117503 A1 | 4/2016 | Reed et al. |
| 2016/0282394 A1 * | 9/2016 | House ............ G06K 9/6276 |
| 2016/0342791 A1 * | 11/2016 | Aguayo Gonzalez ............ G01R 21/00 |
| 2016/0379135 A1 * | 12/2016 | Shteingart ............ G06N 99/005 706/12 |
| 2017/0032279 A1 * | 2/2017 | Miserendino ............ G06N 99/005 |
| 2017/0032745 A1 * | 2/2017 | Sakai ............ G09G 3/3406 |

| | | | |
|---|---|---|---|
| 2017/0140155 A1 | 5/2017 | Aguayo Gonzalez et al. | |
| 2017/0250879 A1* | 8/2017 | Chadha | H04L 43/04 |
| 2017/0307735 A1* | 10/2017 | Rohani | G01S 7/417 |
| 2017/0357828 A1* | 12/2017 | Phillips | G06F 17/28 |
| 2018/0024178 A1 | 1/2018 | House et al. | |
| 2018/0115574 A1* | 4/2018 | Ridley | H04L 63/1425 |
| 2018/0348278 A1* | 12/2018 | House | G06K 9/6276 |

FOREIGN PATENT DOCUMENTS

| | | | |
|---|---|---|---|
| JP | S57-13376 | 1/1982 | |
| WO | 2005/077024 | 8/2005 | |
| WO | 2007/028799 | 3/2007 | |
| WO | 2012/061663 | 5/2012 | |
| WO | 2013/131073 | 9/2013 | |
| WO | 2016/042144 | 3/2016 | |
| WO | WO 2018101848 A1 * | 6/2018 | G06Q 10/00 |

OTHER PUBLICATIONS

S. Fine and A. Ziv, "Coverage Directed Test Generation for Functional Verification using Bayesian Networks", DAC 2003, Jun. 24, 2003, Anaheim, California, USA. Copyright 2003 ACM 1-581 13-688-9/03/000 (Year: 2003).*

Arslan (B. Arslan and et al, "Adaptive Test Optimization through Real Time Learning of Test Effectiveness", 2011 Design, Automation & Test in Europe) (Year: 2011).*

Huang, K. et al., "Counterfeit Electronics: A Rising Threat in the Semiconductor Manufacturing Industry", EEE International Test Conference (ITC), Sep. 6-13, 2013, pp. 1-4.

Lehtonen, M. et al., "Anti-counterfeiting Business Case Report", published in BRIDGE, Dec. 2007, pp. 1-79.

"Principal Component Analysis 4 Dummies: Eigenvectors, Eigenvalues and Dimension Reduction", published at georgemdallas.wordpress.com and available for download at least as of Oct. 30, 2013, pp. 1-8.

Shade, G., "Response to Counterfeit ICs in the Supply Chain", published as part of the IEEE Reliability Society 2008 Annual Technology Report, pp. 1-6.

ABI Electronics SENTRY Counterfeit IC Detector data sheet, http://www.abielectronics.com/Products/SENTRYCounterfeitICDectector.php, downloaded on Jan. 18, 2014, pp. 1-9.

Neumann, P. et al., "How Can V-I Characteristics Help in Counterfeit Component Detection", DAAAM World Symposium, Nov. 2009, p. 1.

Neumann, P. et al., "The V-I Characteristic Comparison Method in Electronic Component Diagnostics", DAAAM World Symposium, Nov. 2011, pp. 0057-0058.

Neumann, P. et al., "How Can V-I Characteristics Help in Counterfeit Component Detection", XX IMEKO World Congress, Sep. 2012, p. 1.

* cited by examiner

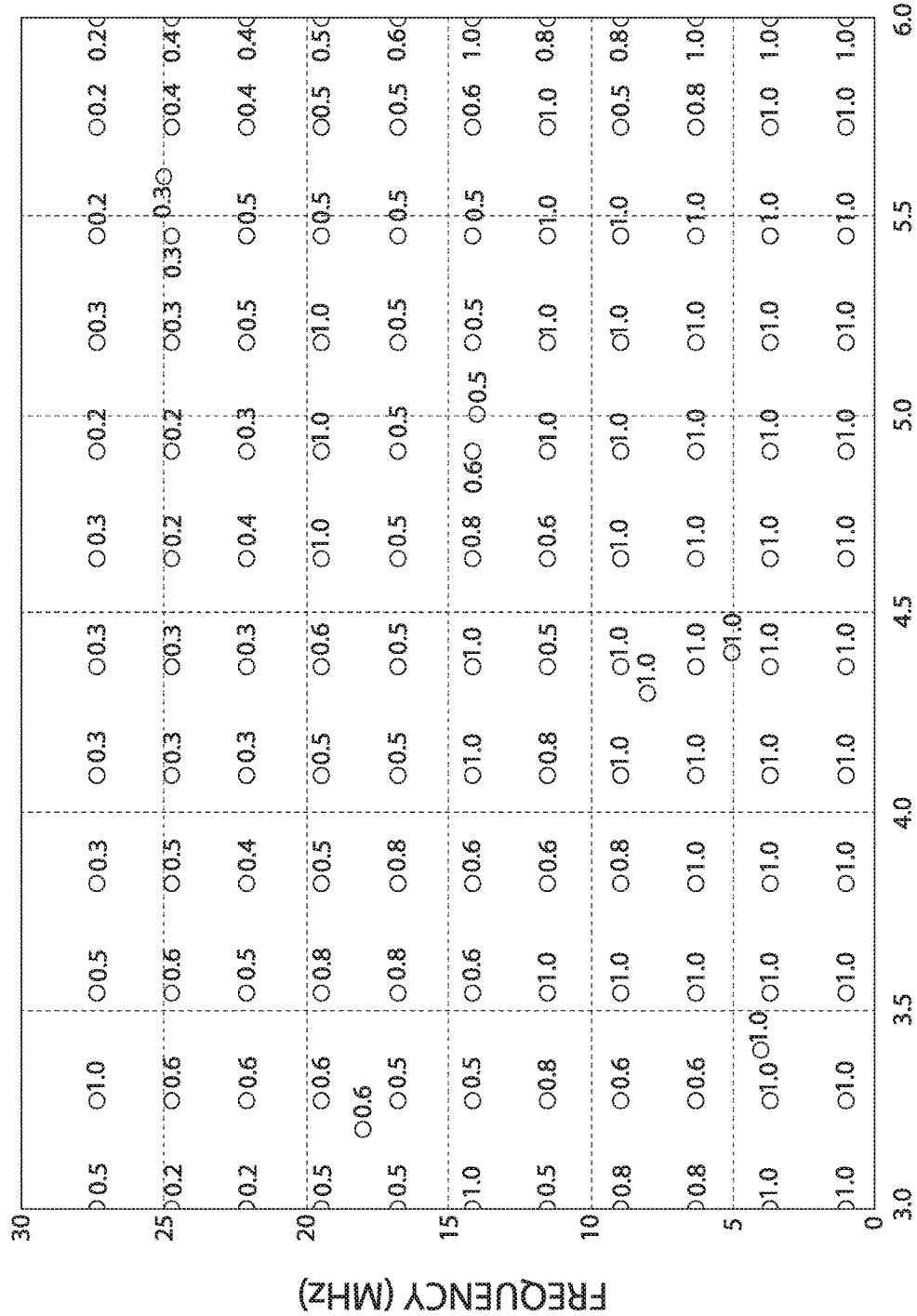

SYSTEM AND METHOD FOR GENERATING TEST VECTORS

BACKGROUND OF THE INVENTION

The present invention relates to counterfeit detection of electronic components, classification of electronic components, or authentication of electronic components.

Electronic components are widely counterfeited. It is estimated that between 5% and 25% of all electronic components include at least one counterfeit component. Some have estimated that counterfeit electronic components cost the industry as much as one-hundred billion dollars every year.

A counterfeit electrical component generally refers to a component that imitates a genuine electrical component. Counterfeit components can include components created from substandard or cheaper components. For example, counterfeit components may substitute an integrated circuit harvested from an electronic trash dump or utilize a die from a substandard new part in an authentic looking package. Counterfeit components can also include older model components or used components that are packaged to imitate a newer model or new component.

Some different categories of counterfeits are described in Table 1.

Conventional electronic component authentication and authentication methods are either ineffective or impractical because of their time to complete or cost to execute. Among the emerging electronic component authentication and authentication technologies there are essentially three broad categories of electronic component authentication methods: 1) authentication based on difficult-to-reproduce physical features, 2) verification of products with unique identifiers, and 3) direct authentication.

Modifying a component to include a difficult-to-reproduce physical feature (e.g., holograms on credit cards) can impede counterfeit component construction. However, difficult-to-reproduce physical features historically have eventually become "easy-to-reproduce" when the financial incentives have justified the effort.

Unique identifiers can be used to serialize and track electronic components using a database for verification. However, mimicking a unique identifier of a known genuine component is not a significant impediment to counterfeit construction. Further, serializing and tracking unique identifiers can become ineffective if the supply chain is flooded with multiple counterfeits that carry the so-called unique identifiers.

Direct authentication relies on intrinsic deterministically random properties of the component, instead of an artificial

TABLE 1

Counterfeit Electronic Component Categories

| Type of Counterfeit Electronic Component | Description |
| --- | --- |
| Trivial Packaging Mimicry | These are empty plastic packages with topmarks appearing to be authentic, or remarked parts that share only external visual traits with the authentic part and are trivial to detect. One problem is when a small number of counterfeits are present in each reel or tube so that testing a sampling makes it unlikely the counterfeits are detected. |
| Salvaged and Refurbished | These are authentic parts that may even have the original markings but have been recovered from electronic waste dumps where they may have been subjected to excessive heat or exposed to harsh chemicals. These components are de-soldered from discarded PC boards and reprocessed to appear new. The chip may in fact authentic, but have degraded performance due to environmental exposure and having been used well into or past their service life. Non-functional parts may also be recovered from salvaged electronics waste. |
| Re-binned and Remarked | This type of counterfeit device may contain the wrong die internally and a remarked or newly manufactured package. In other cases these are parts that were authentic, and perhaps have never been used (so can be classified as "new"), but have their markings changed to reflect a higher specification of an identical function. |
| Factory Rejects and Scrap | Factory rejects and pilot runs can be recovered from the scrap heap for a small bribe, and given authentic markings and resold as new. In order to avoid detection, workers often replace the salvaged scrap with physically identical surrogate packages, thus foiling attempts to audit the scrap trail. Manufacturing rejects are often nearly functional, and with the true manufacturer marking they have the appearance of authentic components. |
| Illegitimate Second-Sourcing | Second-sourcing is a standard industry practice to create pin-compatible replacements for popular products in order to encourage price competition and increase sourcing options. The practice become illegitimate when inferior parts are remarked with the logos of premium brands. |
| Ghost-Shift Parts | These parts are manufactured from new but illegally acquired die and may come from the legitimate manufacturers rejects. The parts are created on the exact same fabrication facility as authentic parts, but run by employees without authorization of the manufacturer and never logged on the books. These parts may be assigned a lot code identical to a legitimate manufacturing run, but will not have undergone the entire testing process. | feature added to the product. Mimicking an intrinsic deterministically random but random property of a component is much more difficult than mimicking an artificial feature that is added to the product for authentication. Although direct authentication can be more difficult to circumvent for this reason, it has its own set of issues (for example, if the intrinsic property is not truly random and can be cloned then it will provide little protection from counterfeiters).

Some direct authentication techniques are destructive. That is, the act of determining the intrinsic deterministically random properties of the component, in some cases, destroys the component. This can still be useful in some situations where it may be possible to destructively authenticate a subset of components from a group in order to authenticate the group as a whole. However, depending on the context, authenticating a statistically appropriate sample size may not be possible or may be cost prohibitive. For example, it may be impractical to destructively authenticate a statistically appropriate sample size of a group of components for use in a national security or public safety context.

Some emerging direct authentication methods of electronic component authentication are not destructive, but instead use intrinsic deterministically random or physically unclonable characteristics to create a "fingerprint" or tag for each component that is recorded, serialized, and tracked through a database. This method can be effective provided that sources and supply chain logistics for the components are trusted and the database is immune from attacks and corruption. Depending on the specific "fingerprint" employed (e.g., package properties) this type of direct authentication may not detect components that contain hardware Trojans or have been weaponized in some other fashion.

One direct authentication method involves side channel power analysis. In this method, analog power consumption of an electronic component is used to classify, authenticate, or detect counterfeit status of the component. This method is discussed in detail in U.S. application Ser. No. 15/178,708, filed on Jun. 10, 2016, entitled ELECTRONIC COMPONENT CLASSIFICATION, which is herein incorporated by reference in its entirety. Side channel power analysis involves stimulating an electronic component or part with a "test vector" and measuring current on a pin of the electronic component. The test vector is a set of parameters that define how to stimulate the electronic component. By comparing responses to these test vectors from known authentic electronic components with unknown components counterfeit electronic components can be detected. Although some classification systems utilize side channel power analysis, classification system can utilize other forms of side channel emissions including power, electromagnetic, photonic, temperature or acoustic information.

SUMMARY OF THE INVENTION

The present invention provides a system and method for generating or selecting one or more test vectors for use in classification of electronic components, such as counterfeit detection or electronic component authentication. One embodiment of the present invention provides a system and method for quickly and automatically selecting a test vector that, when applied to a set of training electronic components, causes the electronic components to produce side channel information that can be used to build a classifier that accurately classifies a set of test electronic components, which may or may not include the training components.

One embodiment of the method for automated test vector selection or generation includes selecting a set of one or more training test vectors; iteratively, installing training components into an electronic component interface, iteratively, applying the set of test vectors to the training components, iteratively, sensing, with a sensor, side channel information from each of the training components for each of the one or more test vectors, iteratively, comparing the side channel information from the at least one training component for each of the one or more test vectors to the side channel information from one or more of the other components for each of the one or more test vectors; iteratively, changing, with a machine learning module, the set of one or more test vectors based on the comparison; and selecting at least one of the one or more test vectors as a trained test vector set.

One embodiment of the system includes an electronic component interface configured for installation of a plurality of training components. The interface is configured to apply a set of one or more training test vectors to each of the training components, either simultaneously or sequentially. The system also includes a sensor configured to sense side channel information from each of the training components in response to the application of each test vector.

The system also includes a control system that is configured to create a classifier for each of the training test vectors. Each classifier is created based on the side channel information sensed from the training components in response to the application of that training test vector.

The control system is also configured to classify each of the training components based on each classifier and determine a quality factor of each classifier based on how accurately the classifier classified the training components.

The system also includes a machine learning module that is configured to update the set of one or more training test vectors, that is select additional training test vectors, based on the previously selected training test vectors and the quality of each classifier created with those previously selected training test vectors.

The system can also be configured to select a trained test vector to be used for classifying a set of test components. The selection can be based on the quality factor of the classifiers of the training test vectors. For example, one or more training test vectors that meet or exceed a score threshold of classifier quality can be selected as trained test vectors. Trained test vectors may also be selected if a coverage threshold has been met or exceeded by the number of training test vectors selected by the system. For example, the system may select the training test vector or vectors with the highest scores from among those available after a certain threshold number of training test vectors have been tested.

These and other objects, advantages, and features of the invention will be more fully understood and appreciated by reference to the description of the current embodiment and the drawings.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components. Any reference to claim elements as "at least one of X, Y and Z" is meant to include any one of X, Y or Z individually, and any combination of X, Y and Z, for example, X, Y, Z; X, Y; X, Z; and Y, Z.

BRIEF DESCRIPTION OF THE DRAWINGS

FIG. 2A illustrates a graph of initial test vector parameters in one exemplary embodiment.

DESCRIPTION OF THE CURRENT EMBODIMENT

Figure 1:
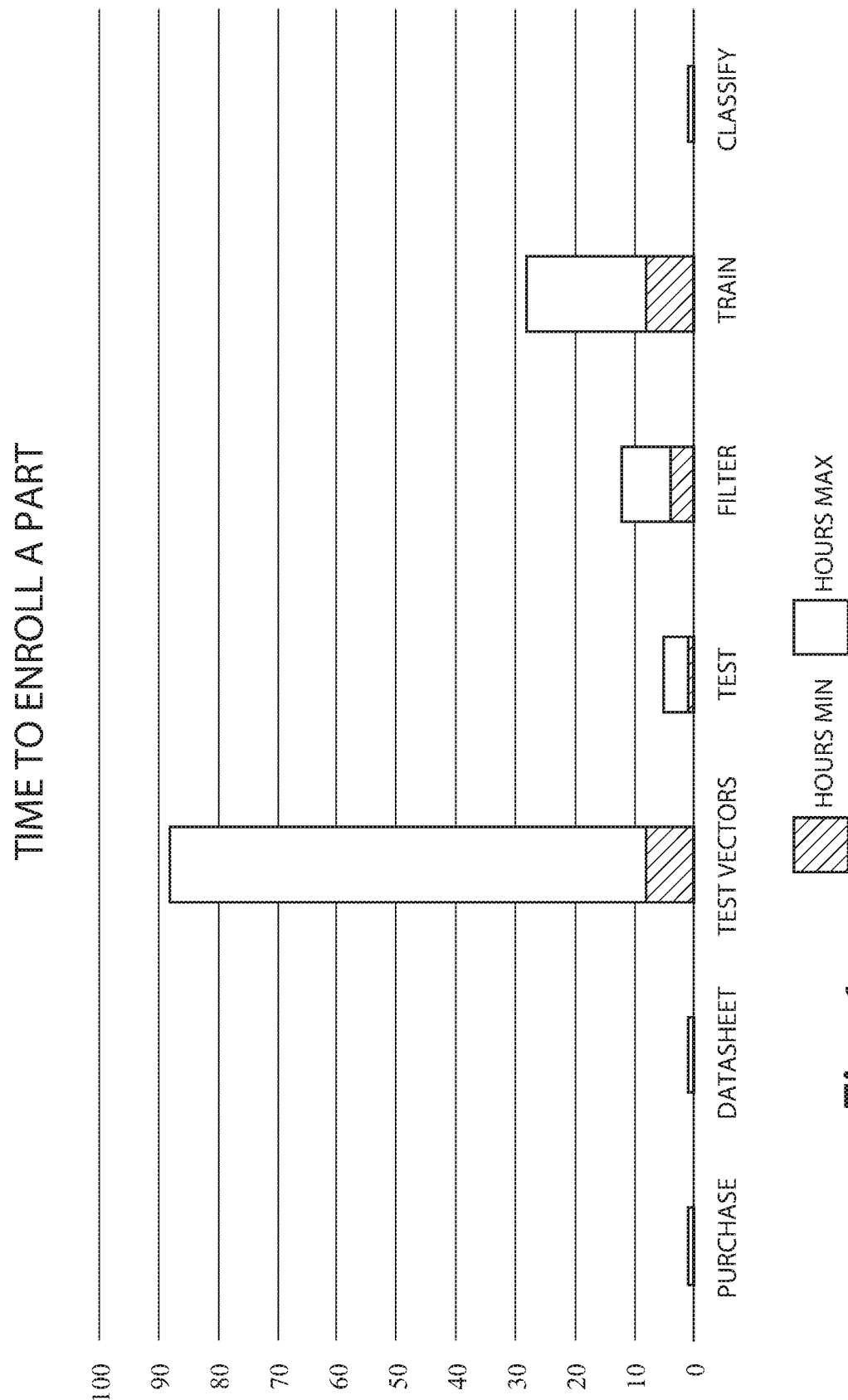
FIG. 1 illustrates a timing chart showing exemplary times for enrolling an electronic component in a conventional test vector generation system.

The present invention is directed to a system and method for automating or semi-automating test vector generation for use in electronic component classification. Classification of electronic components can be used for a variety of different processes including electronic component counterfeit detection and electronic component authentication. Through the use of machine learning and other features of the current embodiment, test vector generation is automated or semi-automated allowing the amount of time spent developing test vectors to be drastically reduced, which is generally a significant portion of time in the overall electronic component classification processes such as counterfeit detection and device authentication processes.

Two fundamental types of classification are possible in the context of electronic components: those with and without requiring parts with known properties. If no known parts are available, parts can be sorted, tracked over time or used for test calibration. Sorting parts is simply testing multiple devices and grouping them according to some property of the test. Tracking parts over time involves testing some property of one or more devices and then later retesting the same devices to determine if a property has changed. Using parts to calibrate test hardware involves testing one or more parts then observing properties of the results are within a desired tolerance.

In the interest of simplicity and clarity, one embodiment of the invention is presented within the context of a system and method for counterfeit detection and is discussed in detail below. Counterfeit detection generally involves testing an unknown electronic component and comparing those test results to parts with a known property. If the component does not have the expected properties, it is classified as counterfeit. If the device falls within the expected class of known good parts, it is deemed not to be counterfeit.

Characterization or examples of known good part(s) is not necessary. In some counterfeit detection embodiments, deviating from a normal classification is sufficient to deem a tested component counterfeit. For example, if 1,000,000 components are tested and 999,800 of them are classified as a first classification and 200 of them are classified differently, then those 200 can be categorized as suspect of being counterfeit for deviating from the normal, expected, classification.

For counterfeit detection and authentication methods, classifications are based on side channel information. Side channel information refers to any information a device produces other than the desired output from the device operation. Any physical information including timing, electromagnetic emissions, power consumption and optical emissions can be included in the definition of side channel information. In order to generate side channel information, electronic components are provided with a test vector or stimulus. A test vector can be a set of one or more signals applied to an electronic component in a particular way. An exemplary test vector can be a set of signals applied to various pins of an electronic component such as a microchip. For example, one test vector may include a 3V signal to the power pin, a 600 kHz 5V signal to the CLK, a 5V signal of a data stream to a certain input pin, 3 floating output pins, and 5 grounded output pins. The side channel information is measured in response to the test vector. Exemplary electronic component classification systems and methods including systems and methods for measuring side channel information in response to a test vector are discussed and described in U.S. Non-provisional application Ser. No. 15/178,708, entitled "ELECTRONIC COMPONENT CLASSIFICATION", filed Jun. 10, 2016, now U.S. Pat. No. 9,759,757, which is hereby incorporated by reference in its entirety. In one embodiment, the side channel information can be the variation of current as measured at Vcc. Most electronic components have pins that can be utilized both for stimulating the component with a test vector or stimulus and for collecting side channel information. However, even electronic components that do not have pins can be simulated with a test vector or stimulus and side channel information can be collected by utilizing any available method of interacting with the component.

Side channel information can identify properties that are a result of the manufacturing process of the electronic component. For example, side channel information can be processed and analyzed to determine whether it is indicative of certain manufacturing characteristics such as defect status, manufacturer, date lot code, process, circuitry differences, rework, and component grade. Side channel information can also be used to detect post-manufacturing changes to a component, including if a component has been used, programmed, subject to conditions outside its operating tolerances, or modified post manufacturing.

The test vector can be supplied to the electronic component with an electronic component interface such as a test fixture or test adaptor. The application of a test vector to an electronic component via an electronic component interface can be referred to as an electronic component interface configuration (or test fixture/adaptor configuration). The configuration includes the actual settings applied to the interface that produces the signal or signals provided to the electronic component to generate the side channel information that is used for counterfeit detection, authentication, or another process that involves collection of side channel information from electronic components.

The test fixture can include an integrated signal generator or be in communication with an external signal generator. The signal generator can generate test vector signals based on instructions provided from an internal and/or remote controller. Further, in cooperation with the electronic component interface, the test vectors can be supplied to the appropriate inputs of the electronic component to stimulate side channel information. The test fixture can include an integrated sensor system for collecting side channel information or the system can include a separate sensor system for collecting side channel information.

Not all test vectors produce side channel information that is useful in classifying electronic components. And, there is not one correct answer to selection of an appropriate test vector. Many different test vectors can produce side channel information that enables proper classification of a certain property at an acceptable level. However, acceptable test vectors are often sparse within the test space and the space frequently includes billions of possible tests. This system and method of automated test vector generation allows for the efficient search of a large test space and can provide confidence that the ultimately selected trained test vector not only works for the training devices but will perform well when testing previously unencountered devices. This confidence can be provided as the tests can be scored on information content and thus give information about unknown devices and previously unstudied distinguishing characteristics. "Transfer learning", applying portions of models trained for one data set to a similar data set to avoid completely retraining a model, can be used to further allow test vectors trained for one device to be used, either directly or with minor modifications, to test similar new types of devices.

Historically, the process of selecting a test vector was conducted manually by an engineer inserting a component into a test fixture, applying a test vector, collecting side channel information, and then reviewing/analyzing the resultant side channel information in order to select a better test vector. This process would be repeated until a satisfactory classification was reached, which often was time consuming, as evidenced by the timing graph of FIG. 1.

Figure 6:
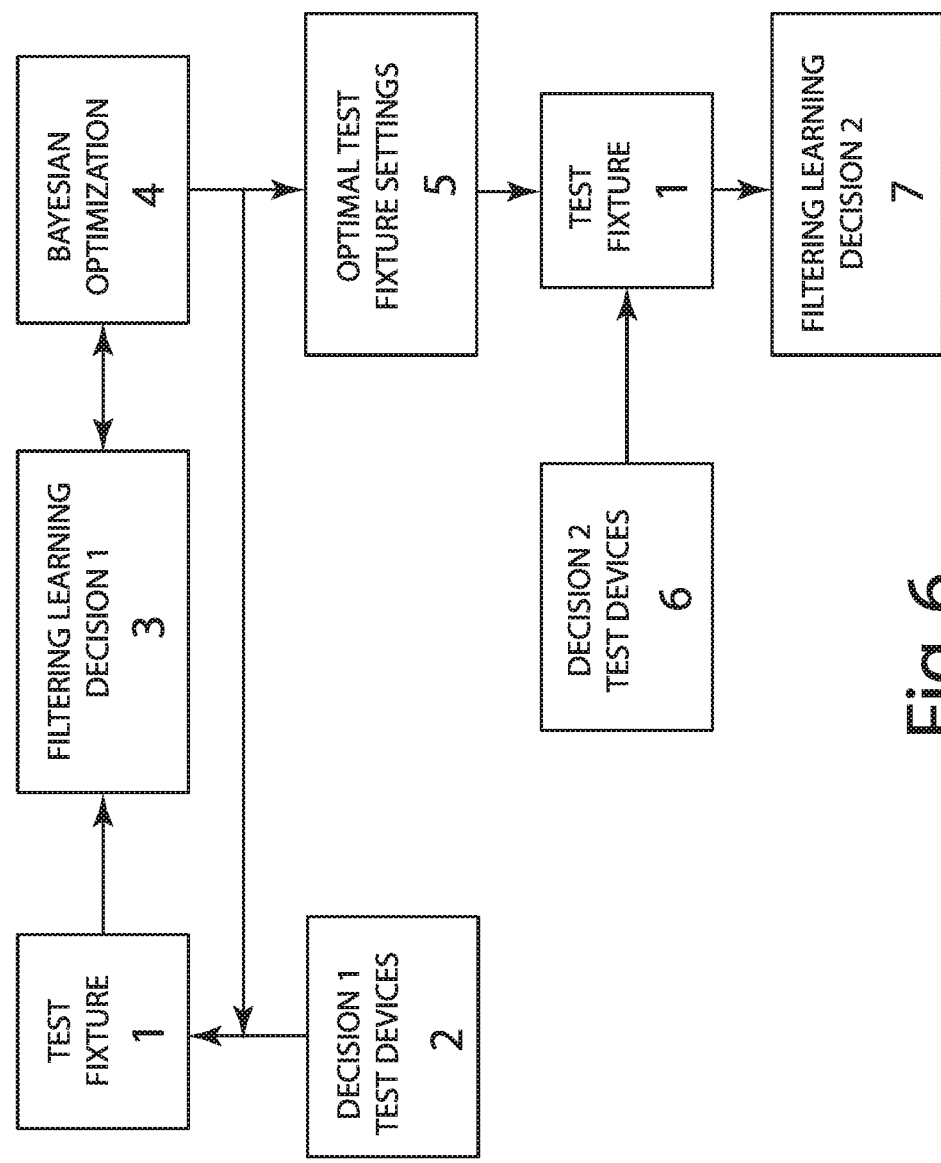
FIG. 6 illustrates a block diagram of one embodiment of the invention.

FIG. 6 illustrates one embodiment of the invention. The invention is not restricted to the example illustrated in FIG. 6 and described herein. The test vector generation process of FIG. 6 begins with an initialization procedure. In the current embodiment, the initialization procedure includes selection of an initial set or grid of test vectors during the Bayesian optimization step 4. A machine learning framework (for example, a Bayesian optimization framework 4) programs an initial grid of test vectors (for example, using a grid search as shown in FIG. 2A) for the signal generator, including parameters such as voltages, clock frequencies, and pin out assignments to the test fixture 1. The machine learning framework can include software on a controller, software on a local computer, software on a cloud based computer cluster, or a combination thereof. In the exemplary embodiment illustrated in FIG. 2A, each dot represents a test vector including a clock signal at the specified clock frequency and a signal connected to a pin of the electronic component at the specified voltage. The test vector illustrated in FIG. 2A tests two pins and is a two-dimensional vector. Other embodiments implement higher dimensional test vectors, but such test vectors are difficult to represent visually.

In the initialization in this particular embodiment, the test vectors are spread out across the available clock frequencies and input pin voltages. In alternative embodiments, a different initialization pattern of test vectors can be implemented. For sake of simplicity FIG. 2A shows a simple set of test vectors that are made up of only two inputs, clock frequency and voltages applied to one fixed pin out assignment. In alternative embodiments, the set of test vectors may include many additional dimensions, for example each test vector may include logical high or low status of five inputs, two clock frequencies applied to different clock lines, and four independently varying voltage levels for these seven pins. In other embodiments, further input parameters may be specified including patterns of logical highs and lows applied to a pin, sequences of code instructions to be run on a device, or shape of a periodic signal applied to the device.

After the training test vectors are initialized, the training test vectors are applied to a set of training devices or components 2 by configuring the test fixture with the training test vectors and applying the training test vectors to the training components via the electronic component interface or test fixture 1.

In the current embodiment, the test fixture includes a current sensor that senses side channel information. For example, the electronic component interface/test socket 310 may include a current sensor that can be utilized to sense side channel information resulting from application of a test vector to an electronic component installed in the test socket. The side channel information can be provided to a control system, such as the depicted filtering and learning module 3 of FIG. 6.

In the current embodiment, the filtering and learning module 3 collects the side channel information and builds a classifier for each training test vector. Each classifier is built using the side channel information collected by applying that test vector to each of the training components. With the classifier built, each of the training electronic components is classified using the classifier for each training test vector and a score is assigned to that training test vector based on how accurately the classifier classified the training electronic components. In one embodiment, the score for the training test vector indicates how well the classifier classified the training electronic components. In this embodiment, a higher score (closer to 1) indicates the electronic components were classified correctly, while a lower score (closer to 0) indicates the electronic components were classified incorrectly, or at least no better than random. The system can automatically select additional training test vectors based on the scores of the classifiers built from previous test vectors. This process can be performed iteratively. The process may be referred to as "machine learning", specifically "metaparameter" or "hard" parameter classification which may include a Bayesian optimization algorithm or another machine learning algorithm.

Referring to FIG. 2A, a specific example is illustrated. In the example, each training test vector produces a score associated with the classifier built using side channel information collected by applying that training test vector to each of the electronic components in the training electronic component set. The shading of each dot in FIG. 2A is indicative of the score for that particular test vector (i.e. in the depicted embodiment the combination of clock frequency applied to the clock pin and voltage applied to the Vcc pin). For clarity, given the greyscale nature of the drawings, the estimated score has been provided next to each test vector. In the current embodiment, the score is indicative of the quality of the classifier produced by that test vector when applied to the training devices. That is, a score of 1 means that the test vector produced a classifier that had no errors while a score of 0 represents that the test vector produced classifier that was no better than a random classification.

Figure 2B:
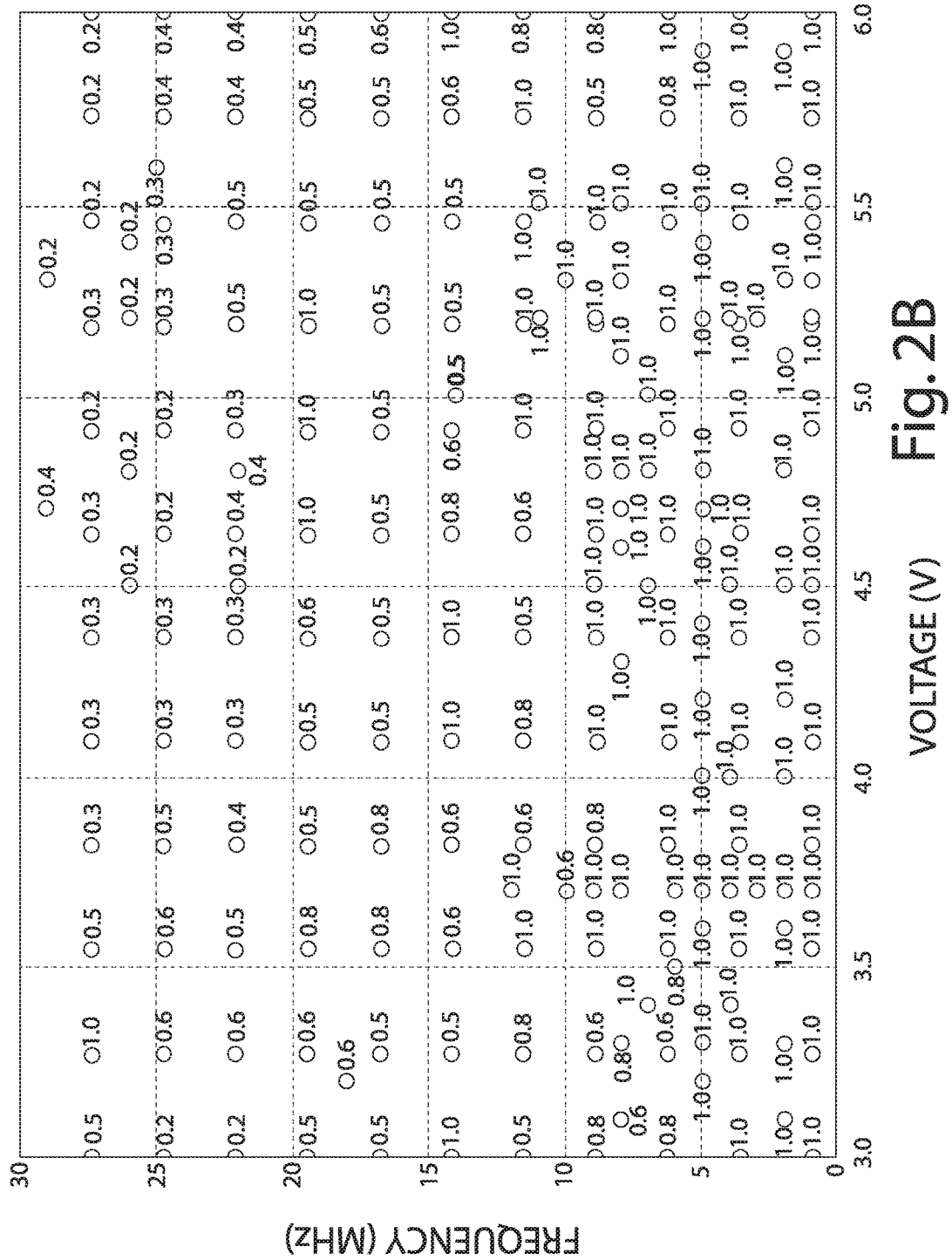
FIG. 2B illustrates a graph of initial test vector parameters and additional test vector parameters selected via machine learning in one exemplary embodiment.

FIG. 2B shows a visual plot of the first two rounds of test vectors and scores. The new dots relative to FIG. 2A are the second round of test vectors. Again, for clarity, given the greyscale nature of the drawings, the estimated scores have been provided adjacent to each test vector. In the current embodiment, the second round of test vectors were selected using Bayesian optimization based on the scores of the first round of test vectors. Future rounds of test vectors can be selected using Bayesian optimization based on some or all of the previous scores. In general, where groups of first round test vector scored highly, additional test vectors near those combinations of frequencies and voltages are selected for testing. In alternative embodiments, different types of machine learning techniques other than Bayesian optimization may be utilized to select the new, updated, test vectors.

The system can have a variety of constraints for test vector selection, for example, minimum and maximal voltage and frequency thresholds for each pin and requirements that certain pins be connected in a particular way. For example, the machine learning framework may require the Vcc pin to have a maximum of 19V applied, the Vdd pin be connected to ground in all test vectors, and a 19V clock signal be applied to the clock pin at a rate that is between 0.2 and 10 Mhz. These constraints can be selected based on the component to be tested. In the embodiment depicted in FIGS. 2A and 2B, the clock frequency is constrained between 0 and 30 MHz and the Vcc pin is constrained between 3 and 6 volts.

As mentioned above, the side channel information produced by the tested electronic components is provided to the "processing/filtering and learning" or scoring module 3. The module 3 creates the score for each test vector. In the current embodiment, the score for each test vector is derived based on how accurately a classifier built using the side channel information collected as a result of applying that test vector to the training components classifies the training components. In general, the processing and learning module 3 builds the classifier based on the side channel information for that test vector and can also customize each test vector's classifier and signal processing.

In the current embodiment, the module 3 accomplishes this by receiving the side channel information from the electronic component interface that was generated in response to a test vector being applied to each of the training electronic components. This side channel information from each of the training electronic components is utilized to build a classifier. The classifier is then used to classify the training components and determine a score for the quality of the classifier. The quality of the classifier is dependent on how accurate the classifier classified the test components. For example, a test vector that creates a classifier that classifies 180/200 EEPROMS correctly receives a score of 180/200 or 0.9 whereas another test vector that created a different classifier that only classified 160/200 EEPROMS accurately would receive a score of 160/200 or 0.8. In alternative embodiments, different methods of determining the quality of the classifier can be utilized.

It is worth noting that each classifier built by module 3 can be customized. That is, the system can iteratively adjust various parameters to find a custom classifier that classifies the electronic components the most accurately for that test vector. That is, the training test vector being used to build a particular classifier can undergo a classifier training process to generate a customized classifier and signal processing scheme that is used to determine a score for that test vector. In other words, many different classifiers can be built using the side channel information generated from the training components by applying the subject test vector. Various parameters in generating the classifier can be adjusted that affect the ultimate quality of the classifier and therefore the score of the test vector.

These classifier parameters fall into two broad categories, "soft" parameters and "hard" parameters. "soft" parameters generally refer to software parameters, which are parameters that can be changed in software. These are parameters such as filters and classifier decision boundaries, which can be adjusted and the classifier rebuilt without having to re-collect any side channel information by reapplying the test vector to the training components. Other examples of "soft" parameters include the width of a bandpass filter used to reduce noise in the data set, the choice between FFT and wavelet transform for noise reduction, or the expected number of clusters for an unsupervised clustering algorithm. Soft parameter optimization can be solved by machine learning, such as Bayesian optimization, separate and apart from the machine learning/Bayesian optimization that can be utilized to select additional training test vectors based on previous scores. Further, the machine learning system may be configured to add or remove training components from the training component set to improve the learning rate of the system.

"Hard" parameters, on the other hand, generally refer to hardware parameters, which are parameters that can be changed in hardware. These are parameters such as frequency, duty cycle, or voltage, which are applied to the electronic component. Changes to these parameters may require the test vector to be re-applied to the training components so that the side channel information can be re-collected.

It is also worth noting that alterations of the classifier parameters, of both the soft and hard variety, can be done on a per test vector basis. The soft and hard parameters can be adjusted and optimized in a variety of different ways. They can be selected according to a pre-defined criteria, based on the datasheets for the training electronic components, or a variety of other methods. In one embodiment, the module 3 can make decisions regarding the parameters by solving a global optimization problem across the parameter space. For example, the module 3 can search intelligently for parameters according to a pre-defined criteria or algorithm.

After receiving scores for the first batch of test vectors, the Bayesian framework 4 updates its knowledge of the surface of all possible tests. It then outputs a second set of test vectors to the test fixture 1 which, in the embodiment of FIG. 6, minimize regret at the batch level and these test vectors are programmed into the test fixture 1. The system retests the components and the process repeats until a score threshold (e.g. threshold test vector score or scores) or space coverage threshold (e.g. predetermined number of iterations) is met. Once the score threshold or space coverage threshold are met, the system can select a final test fixture configuration 5, which may be referred to as a trained test vector set or an optimal test fixture setting. The trained test vector set may be a single test vector or a collection of test vectors. Further, the trained test vector may be one of the training test vectors or a test vector based on the training test vectors. In one embodiment, the trained test vector set includes one or more of the training test vectors that generated the highest score. This trained test vector set or optimal test fixture settings can then be used to test suspect or unknown components and determine if they are counterfeit or it can be used as the test vector to generate side channel information for use in another classification process. For example, as shown in FIG. 6, the trained test vector set can be applied to a set of test devices 6 via the test fixture 1. The resultant side channel information from the application of the trained test vector set can be collected and analyzed by the filtering learning module 7, for example in order to classify the test devices 6. It is worth noting that the test devices may or may not include the training test devices 2.

In some embodiments, the system is trained with legitimate parts that are likely to have mechanical differences. For example, it can be useful to train the system with the same type of electronic components that were created at two or more different facilities. Although the component is functionality identical or similar by nature of being the same type of component, the components are likely to have physical differences as a result of being produced at different facilities, for example because they are produced on different assembly lines with different QA procedures. "Transfer learning", applying portions of models trained for one data set to a similar data set to avoid completely retraining a model, can be used to further allow test vectors trained for one device to be used, either directly or with minor modifications, to test similar new types of devices. Accordingly, by using the same type of electronic components known to be produced at two or more different facilities the testing process can be configured such that the iterative machine learning training process searches for information rich test vectors. These test vectors, when applied to devices that may be counterfeit, will sense the somewhat similar physical differences between counterfeit and authentic devices producing the information necessarily to determination device authenticity. This methodology can be valuable as it provides assurances the test vector will be successful in finding counterfeit devices despite never training on example counterfeit devices.

Figure 7:
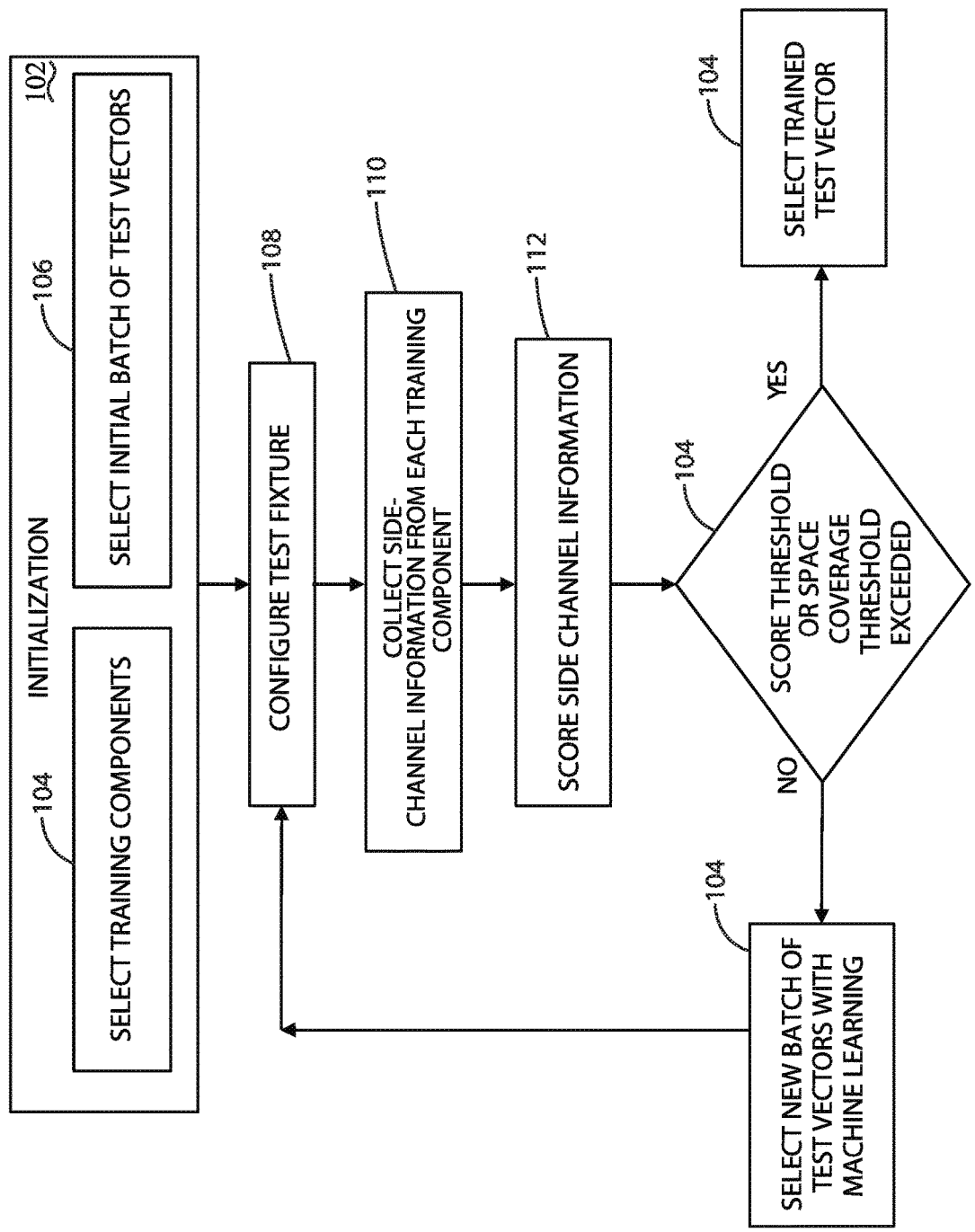
FIG. 7 illustrates a flow diagram of one embodiment of a method of generating a trained test vector set.

A concrete example of use of the above system is presented here for further clarity with reference to the flow diagram of FIG. 7. Use of the current invention is not restricted solely to this example. The process beings with obtaining training components that can be used to train the system 104. The training components can vary. In some embodiments, the training components have known distinguishing characteristics. For example, the training component set may include two or more different types of components. Or, the training components may be the same type of component, but be produced at different facilities. Or, the components may be the same type of components produced at the same facility, but have different software installed. The system can utilize a wide variety of different types of training components.

The training components may or may not be the components that ultimately are going to be used for testing. For example, if the goal is to detect counterfeits in a lot of 10,000 electronic components, sometimes referred to as the test components, a subset of those components may or may not be used for training the test vector generation system. That being said, generally one or more known distinguishing characteristics should be known about the training components though the distinguishing characteristic(s) need not be the same characteristic(s) the system will ultimately test for.

Figure 4:
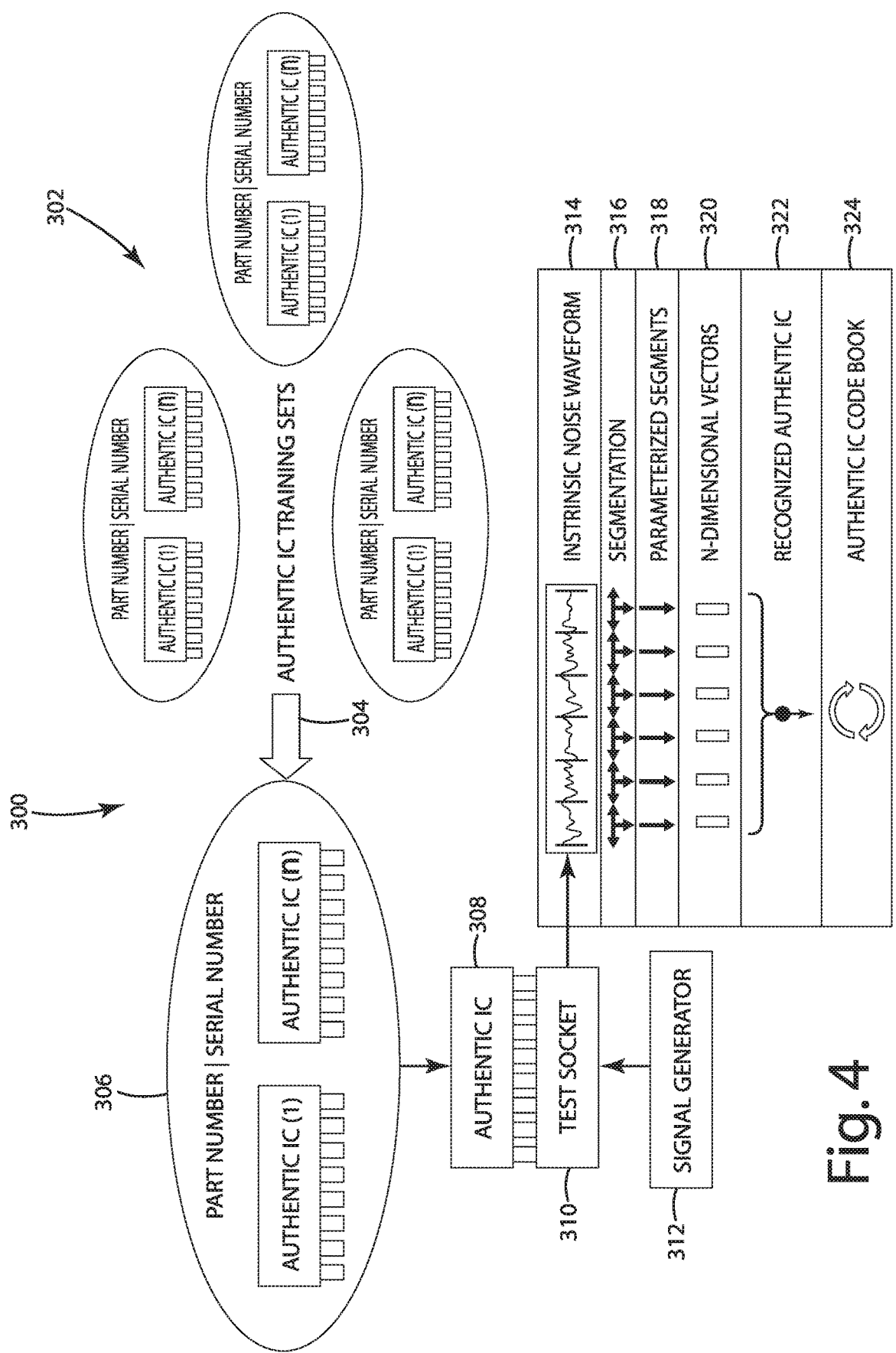
FIG. 4 illustrates one embodiment of a hardware test setup.

The process can utilize a hardware test setup similar to the one provided in U.S. Non-provisional application Ser. No. 15/178,708, entitled "ELECTRONIC COMPONENT CLASSIFICATION", filed Jun. 10, 2016, now U.S. Pat. No. 9,759,757, which is hereby incorporated by reference in its entirety. One embodiment of the hardware test setup is illustrated in FIG. 4, which includes an electronic component interface or test socket 310, which can be used to stimulate an electronic component and collect resultant side-channel information from the electronic component.

The data sheets of each of the training components can be analyzed to identify what can safely be done to the components. For example, any constraints of the clock frequency or voltage level constraints for any of the various pins of the components can be determined and entered into the system so that the system does not select test vectors that violate those constraints.

An initial batch of test vectors can be selected 106 using a variety of different techniques. For example, the initial batch of test vectors may be selected to spread out across the available the available test vector space. After this initialization 102, the test fixture can be configured to apply the initial batch of test vectors to the training components by configuring the test fixture 108.

The first iteration of configuring the test fixture may involve generating a global optimization framework. The global optimization framework is the underlying software and algorithms for finding a global maximum. The global optimization framework can be created once for each training and is used to optimize test vector scores. The global optimization framework can be redesigned per test, but need not be redesigned per test. The global optimization framework may be configured to change automatically, for example at each iteration, if the selected test vectors perform sub-optimally.

One exemplary embodiment of generating a global optimization framework includes 1) representing the test vector parameters as coordinates, lists, or vectors in software or memory (e.g. clock frequency, pin 1 voltage, pin 2 voltage); Parameters are physically what can be done to the component. They can be dictated by pin out and can be pins but don't need to have one to one correspondence. For example, two parameters, voltage and clock frequency can be varied on one clock pin. If there are 8 data pins there may be separate parameters. A parameter may be defined by pin, but each parameter may have multiple sub-parameters. For example, a pin parameter might be defined by a voltage value. Alternatively, the parameter may include two sub-parameters, voltage and frequency. Test vector parameters may also be tied across multiple pins, for instance all pins may need to be at the same voltage level but that level may be allowed to vary; 2) configuring the framework based on a constraint function for the coordinate system (e.g. 0-20 Mhz clock frequency, 0-19 V for pin 1, Vdd ground); 3) writing global optimization software—for example a Bayesian optimization framework that finds coordinates in a mathematically optimal way; and 4) initializing the global optimization software per test—this can be done by selecting an initial batch of test vectors that are distributed fairly evenly across the space defined by the test vector parameter coordinates, alternatively or in addition information from previous tests could be used to inform the initial selection of test vectors. The function the global optimization framework is optimizing is dependent on test vector scores or quality, for instance how well side channel data collected with a test vector is able to distinguish classes of test devices on a scale from 0 to 1. In mathematical literature it is common to use Bayesian optimization to minimize "regret", a weighted sum of the local density of points already tested and 1 minus the predicted point value. Regret can be minimized in batches where multiple points with low regret are chosen before any points are tested and local density is updated with each anticipated test point. Applied to the currently discussed embodiment, this results in choosing iterations of test vectors that are both significantly different from previously tested vectors and each other and likely to correctly classify electronic components.

The test fixture can be calibrated during the configuration process 108. This can include calibration settings for each test vector and noise reduction for the current environment. The calibration can include adjusting various settings iteratively for one or more components to identify settings to use for each test vector for all future components. For example, one component can be installed and before collecting side channel information for that first component, calibration can be done to adjust various settings such as oscilloscope settings. Calibration information can be stored on a per test basis for any other components using that test vector. Then, when that test vector is run on other components, the same calibration settings can be utilized.

From there, a batch of training devices can be tested by applying the training test vectors and collecting the side channel information 110. That is, an automated system can place and remove training components so that each test vector can be run on each training device and side channel information collected. Alternatively, the test fixture may include sockets for all or a subset of training components so that the components do not need to be placed and removed. Alternatively, the components may be placed and removed manually or automatically, for example upon prompting from the system or via a pick and place system.

The system analyzes and scores the side channel information from the training components 112. This can be done without human intervention. An optimization framework searches over all available software algorithms and parameters to find the best ones per test to score each test vector. Any criteria that is indicative of test fixture performance can be used for scoring. For example, performance of a classifier created from side-channel information collected using the test vector or signal to noise ratio of side-channel information collected using the test vector. The optimization framework can aggregate or concatenate all scores along with metrics as to how the overall test vector batch went. The optimization framework can use the overall metrics to throw out any training components for the training test vector batch that are reducing signal to noise. The optimization framework can also abort the entire process at any iteration if it determines test vectors are degrading component performance or the training is not producing good results.

The optimization framework determines whether any of the test vectors have met or exceeded a score threshold or whether a space coverage threshold has been met or exceeded 116. If one of the applicable thresholds has been met the system can select a trained test vector set that includes one or more test vectors 118. For example, a score threshold can be established such that if one or more test vectors produce a score above that threshold, the test vectors are selected as the trained test vectors. If no test vector exceeds the score threshold, the test vectors with the highest score or scores may be selected as the trained test vectors if the space coverage threshold has been met or exceeded. The space coverage threshold is the number of test vectors used to train the system after which the system determines there has been sufficient training and the best test vector or vectors found so far should be selected, usually for sake of expediency.

If the system is not satisfied with the any of the training test vectors, the process can be iterated beginning with selection of a new batch of training test vectors selected with machine learning 114, as discussed above. New training test vectors are used to train the system until a test vector is identified that meets or exceeds the score threshold or the space coverage threshold is met or exceeded. If enough test fixtures or automation machinery are available to train all components at once a human doesn't have to touch the system once they insert the components, all the rest can be automated. If there are not enough test fixtures the software can minimize, in the mathematical sense, the amount of wear on a part (between taking it in and out and testing it) needed to train the component. The result is one or more test vectors selected out of all nondestructive tests for distinguishing a type of trait on any test component of the same component type.

A particular example is provided. 200 EEPROMs with identical part numbers are purchased. 100 of the EEPROMS were manufactured at a facility in one country and 100 of the EEPROMS were manufactured at a different facility in a different country. The global parameter optimization framework is configured to search over the test space of a fixed ground, 0.1-5V of power, and all 16 bit patterns clocked at a frequency of 1-20 MHz on the most significant bit address line. One component is placed at random into the test socket. The meta-parameter optimization framework chooses an initial batch of 50 test vectors to apply to the component based on quality vectors found from testing previous EEPROMs and space coverage or another initialization process. The automation framework creates and saves any parameters that can be directly calculated for each test, such as the dynamic range of the digitizer used for side channel measurements. The test engineer then tests all 200 parts, which includes inserting each part into the test socket as the automation framework will reconfigure it for each of the 50 tests. The optimization framework splits each class into devices that will be used to determine test soft parameters and devices that will be classified then calculates ideal FFT band pass filters, number of dimensions for a PCA reduction, and multi-class SVM hyper-parameters for each test. The optimization framework records the number of correctly classified devices as the test vector score and best soft parameters for each test vector. Batch regret minimization is then used to generate 50 more tests and testing continues. Once test vectors are found that separate the two classes of chips sufficiently they are used to train a one class support vector machine ("SVM") with 5000 known good devices to detect counterfeits.

Side channel electronic component authentication methods can include determining n-dimensional identity vectors that share sufficient similarities for all chips or components within each class of authentic components to cluster with low Type I and Type II errors. This allows a low cost, rapid, nondestructive authentication and validation of chips from non-trusted sources. It also can enable 100% examination of chips without modifying the chip packaging (e.g., inserting or attaching tags or taggants), altering the chip design (e.g., die level edits or functionalizations such as using physically unclonable functions to generate identifying signatures), or inserting new technology into the manufacturing process. Sidechannel electronic component authentication methods can address the issue of electronics reliability where there are no trusted foundries to produce the parts and instead parts must be acquired from international chip brokers and secondary markets where there may be vulnerabilities in the supply chain.

Without the aid of the present invention test vector generation for sidechannel authentication systems is a manual effort that sometimes can require weeks of advanced engineering time per component. Automated test vector generation can accomplish this task in significantly less time and with less and more easily available test components, for example in some cases in about four hours with as few as 200 test devices. Thus, the improvement eliminates or significantly reduces what high level engineers are required to do, achieves better results, and adds confidence to future test performance with often more than an order of magnitude less effort.

Figure 3A:
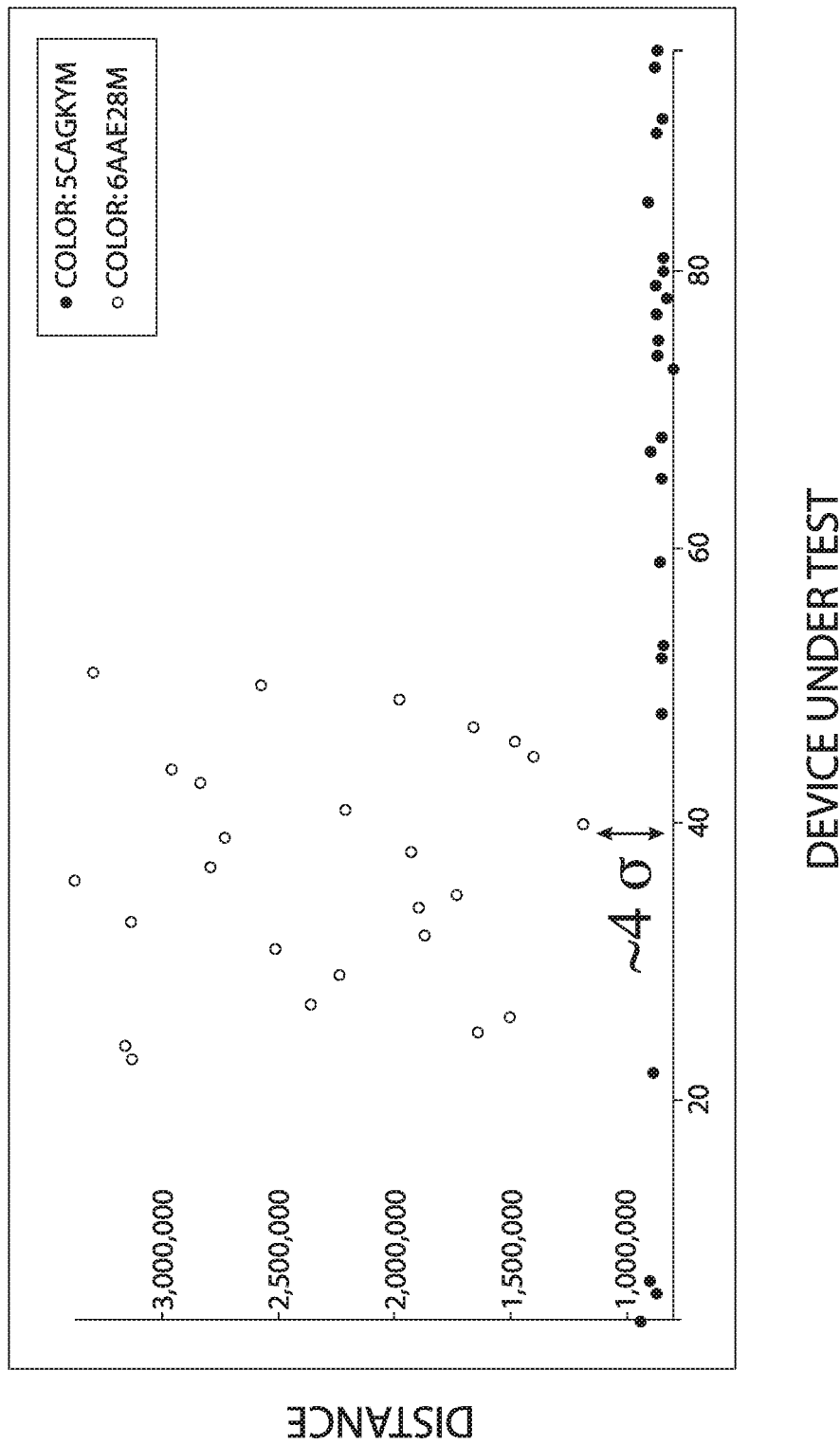
FIG. 3A illustrates a classifier created with a conventionally selected test vector.

For example, as shown in FIG. 3A a skilled engineer strategically selected a test vector for an electronic component (date-lot code 5CAGKYM) based on his years of experience and trial and error with various test vectors. That test vector was utilized to create a one-class classifier for the electronic component as shown in FIG. 3A. Then, the electronic component (date-lot code 6AAE28M) was classified using that one-class classifier. The relative effectiveness of the classifier can be measured in terms of multiples of the standard deviation of the known good class. Conventionally, engineers evaluate one test vector at a time. This involves inserting a number of electronic components into the test socket, evaluating each one with the test vector and collecting the waveform data, then compiling, processing, and analyzing that data to determine the effectiveness of that test vector. This process is time consuming because it takes about 2 seconds to take out and reinsert a new part in many manually operated test sockets. In addition, all of the removal and reinsertion of electronic components in the test socket can cause tester fatigue, part/socket damage or bad data resulting from poor insertion.

Using automatically reconfigurable test hardware, multiple test vectors can be evaluated per one insertion of each electronic component. This can ultimately save time because fewer electronic component need to be removed and inserted. This multi-scan system is especially effective in combination with machine learning methods such as Batch Bayesian Optimization that can provide batches of test vectors to maximize total test batch effectiveness based on the results of previous test vector batches. These methods balance exploration of unknown regions of the test vector space and exploiting known good regions of the test vector space, ensuring that each vector in a batch will produce unique and useful information.

Known side channel component classification systems have unacceptable inefficiencies. The general work flow of a side channel based part classification system is illustrated in FIG. 1 and includes purchasing electronic components, such as integrated circuits or chips, from multiple lots or with other distinguishing properties, a skilled engineer reading each data sheet corresponding to the purchased chips, the skilled engineer iteratively devising test signals for conducting the side channel power analysis, testing parts using those test signals to develop a signal processing pipeline and a classifier and evaluating the effectiveness of that classifier. This process, especially devising appropriate test signals, can be time consuming.

There are practically endless possibilities for test vectors and no one right answer. Different test vectors will stimulate electronic components in different ways to produce effective classifiers. There is a balance to be struck between thoroughly covering the space of possible test vectors and quickly selecting a test vector that can classify components based on the desired property with an acceptable success rate. Embodiments of this invention combine meta-parameter optimization methods with system automation to produce quality test vectors at a rate and level of assurance that is not possible for manual processes.

Figure 5A:
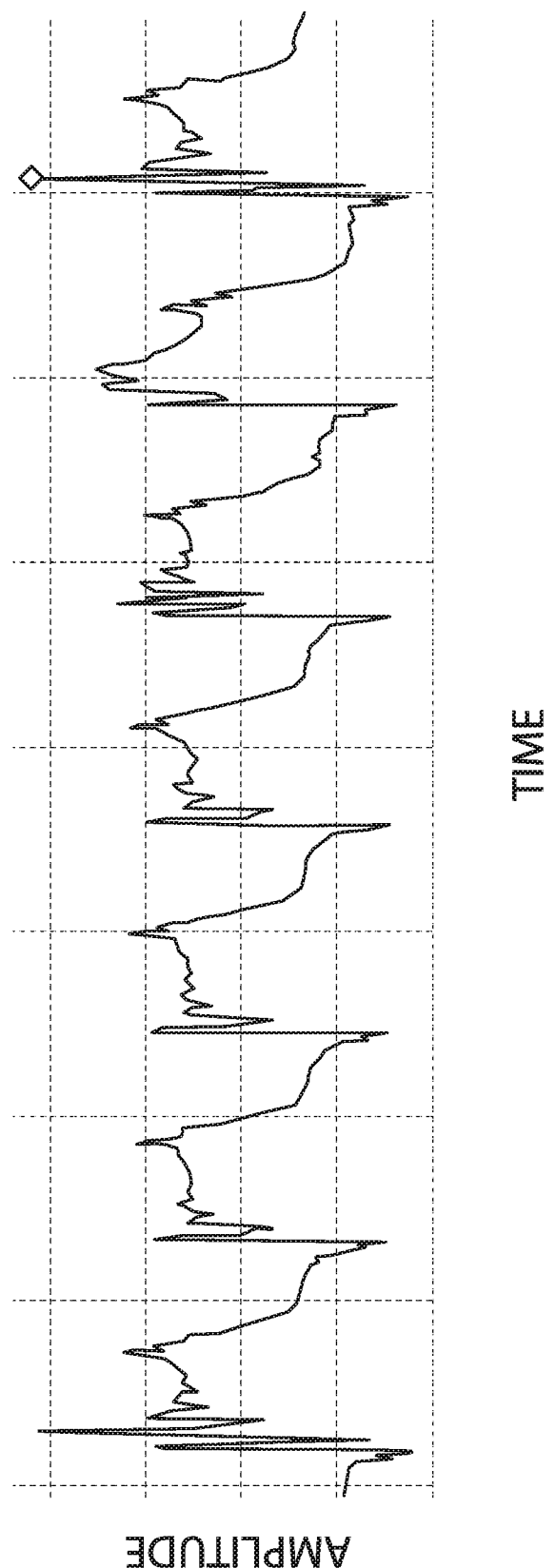
FIG. 5A illustrates an exemplary waveform of side channel information generated by a test vector being applied to one of a set of training components.
Figure 5B:
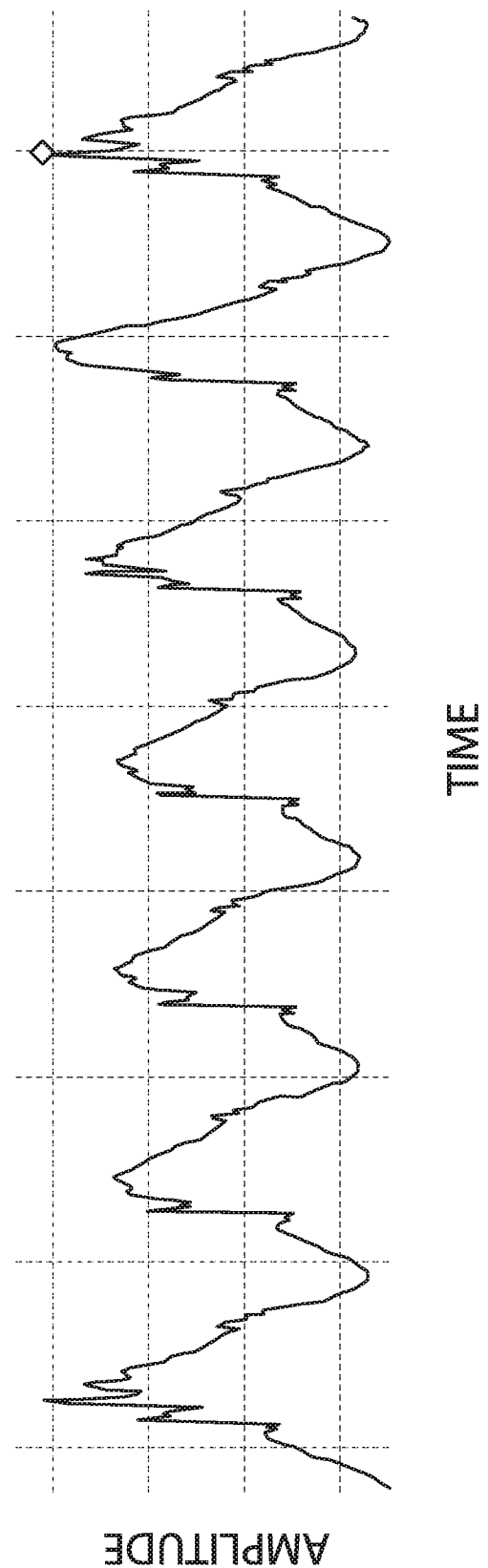
FIG. 5B illustrates another exemplary waveform of side channel information generated by the same test vector applied in FIG. 5A but to a different one of the set of training components.

An engineer traditionally devises test vectors or signals using experience along with trial and error. The engineer can consider a variety of different factors, including how the electronic component will be used. How the test vector is applied to the component (e.g., what pins on the electronic component are stimulated) and the particular values of the parameters of the test vector may be selected based on a wide variety of factors. For example, the engineer may want to ensure the test vector exercises the electronic component function or design. In general, a better test vector will produce a waveform that is significantly different from similar electronic components (e.g., two devices with a different date-lot code, or two devices that perform the same function but have a different amount of memory). FIG. 5A and FIG. 5B illustrate two exemplary waveforms that show effective waveforms generated by the same test vector. These two figures illustrate the waveforms of an electronic component with 1 megabyte of memory and 2 megabytes of memory. The test vectors produce different waveforms, which means they are likely to be able to be differentiated during classification and therefore the test vectors selected highlight the differences between the two chips. A less effective test vector may produce waveforms that are much more similar for these two devices and that ultimately make it difficult to differentiate these types of devices.

A test vector can include a variety of different parameters. Although a test vector may include a variety of different parameters, in some situations only a subset of parameters can be changed. For example, a test vector may include 10-20 different parameters, but only one or two are variable. In one instance, for example as shown in FIGS. 2A and 2B, the test vectors include a clock frequency value and a voltage value which are variable.

The test vector may include one or more connection paths for the pins. Some or all of the connection paths may be varied. For example, some test vectors may only apply power and ground, while others may apply test signals to additional or different pins, such as I/O pins. Embodiments of this invention may as many or as few test signals to a part as necessary to produce the desired behavior differences, and signals can be sent to the part in any manner that is nondestructive to the part. In particular, test signals do not have to comply to normal operating suggestions for a device. For example, applying a very low voltage to a microprocessor would be a valid test configuration even though the device would not execute instructions.

Machine Learning for Filtering

Methods for selecting test vectors based on machine learning can learn to avoid noise even without the explicit use of physical or mathematical filters. This follows from the current invention's definition of a quality test vector as one producing desirable properties such as high classification rate, information content, or signal to noise ratio when applied to devices. The machine learning system can learn test equipment limitations and learn to avoid unwanted in-class outliers as test vectors that are greatly affected by these noise sources will be deemed poor quality.

Machine learning is further advantageous in that chips from trusted sources are not required. Only a very small number of components (e.g., as small as a single component that is initially trusted) can be used to create a classifier that can authenticate components already in the supply chain that have not been tagged and are not necessarily from trusted sources. Supervised methods may also be replaced with unsupervised methods or clustering in the complete absence of components with known properties. While this type of classification will not guarantee the properties of any component, the machine learning system of the current embodiment of this invention can instead be scored purely on the ability of a clustering algorithm to separate devices. Furthermore transfer learning can be utilized to improve the performance of the current invention in the absence of quality test devices. Both "hard" and "soft" parameters can be transferred between experiments.

Classifiers

Classifying an electronic component as not counterfeit, cloned, or otherwise undesirable can be difficult as example components known to have these undesirable properties may be unavailable. Furthermore, the question underlying classification in these cases is whether a component is devoid of all undesirable properties. One-class classifiers or unsupervised clustering techniques perform these types of classifications. While the use of multi-class classifiers are not precluded under the current embodiment, one-class and clustering algorithms are generally more difficult to train and evaluate and thus will be discussed presently. Initially evaluating test vector is not necessarily yet determining properties of components under test but simply determining the quality of the particular test. Any measurement of information content or signal to noise ratio including multiclass classification performance may be used for assessing test quality in this invention regardless of the nature of the end classification without further modification. This assessment can also be performed using test components that are have properties differing from the components used in the end classification or clustering and any initial classification may or may not classify the same property as the end classification or clustering. For simplicity and clarity the embodiment that uses multiclass classification of easily identifiable device properties such as date-lot code to determine test quality will be discussed. This embodiment can be advantageous over simply using the same procedure to determine test quality as to classify devices as it frequently requires fewer test devices and easy-to-find properties, such as distinguishing between two common manufacturers, can be tested for.

The flexibility of design was selected to allow for leveraging the most effective tool available at each step of the test vector generation process. In general, geometric multiclass classifiers can be considered effective in two distinct ways: how clean the classification is (e.g., the receiver operating characteristic curve) and the relative separation in terms of classes as compared to the separation of points within a class. FIGS. 2A and 2B illustrate an example of this effectiveness score of a classifier. Each point in FIGS. 2A and 2B represent a set of test vector parameters. In this particular instance, a voltage and frequency make up the test vector parameters that result in a score of the effectiveness of the classifier built using that set of test vector parameters. The score is shown using the color of the point. On the given scale in this embodiment, a score of 1 represents that test vector produced a classifier that had no errors in classification and classes were separated by an infinite number of standard deviations of the largest test class while a score of 0 represents that the test vector produced classifier that was no better than a random classification. Scores in-between 0 and 1 represent the information content and thus suitability of a test vector with higher scores being better.

As the receiver operating characteristic curve is fundamentally measuring the number of misclassified points it can be supplemented with further information if 100% correct classification is expected. A natural choice for this in geometric classifiers is the ratio of standard deviations of distances between points within a class and distances between points in differing classes. This may be referred to as a confidence interval that indicates a relative degree of confidence in the classification provided by the classifier. If the classifier created by a test vector results in greater separation from another class, then it generally is a more effective classifier and will result in a higher confidence interval. This is highlighted in FIGS. 3A and 3B where the FIG. 3A classifier has 4 standard deviation separation from the tested class (date-lot code 6AAE8M) and the FIG. 3B classifier has twenty standard deviation separation from the tested class (date-lot code 6AAE8M).

Meta-Parameter

Using machine learning such as the Bayesian optimization to select test vectors can increase the speed and effectiveness of test vector generation. Further, the tester does not need to be an experienced engineer to operate the system and generate the test vectors.

Figure 3B:
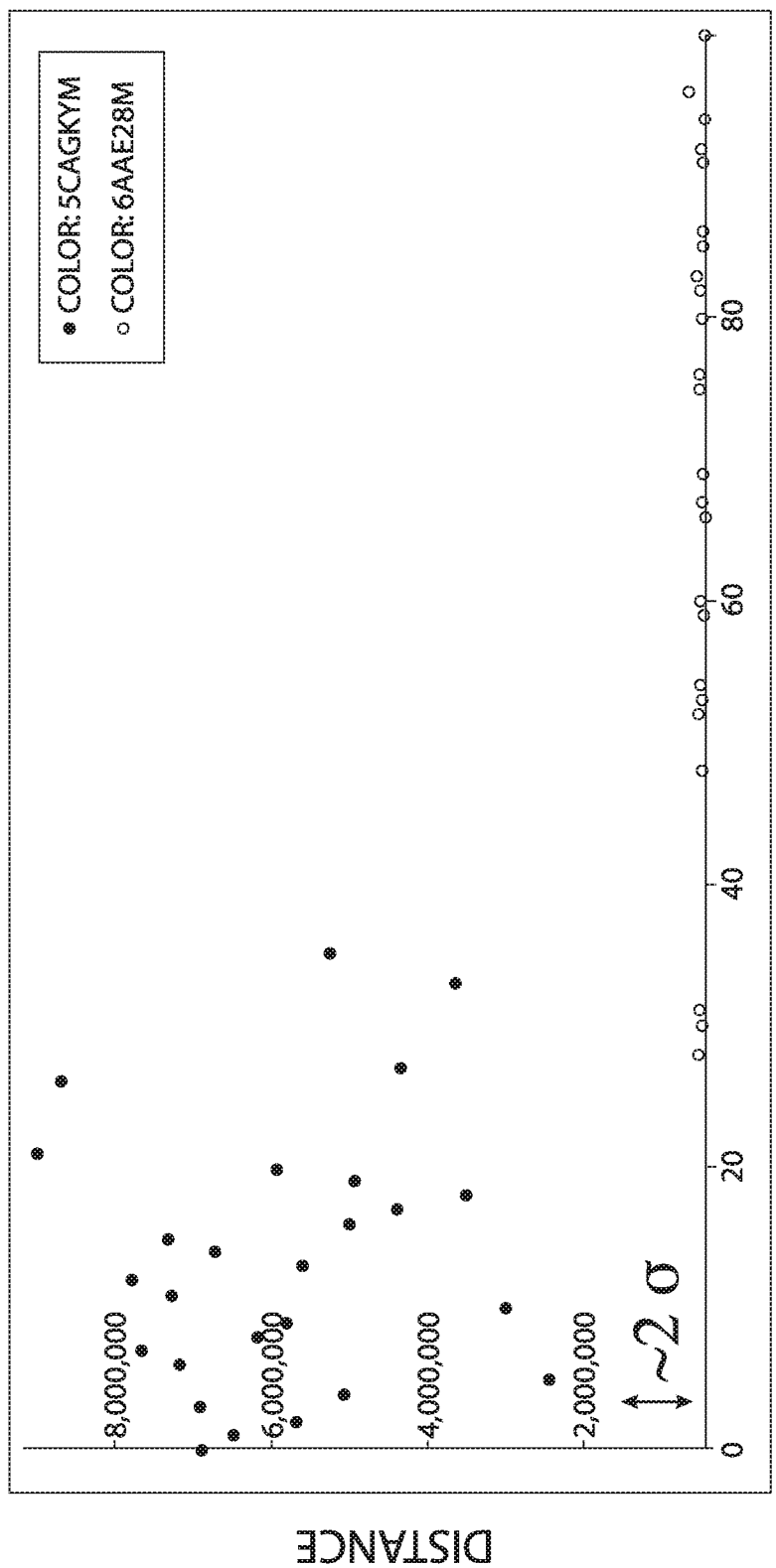
FIG. 3B illustrates a classifier created with a trained test vector selected by one embodiment of the present invention.

For the sake of simplicity and clarity, an embodiment that utilizes Batch Bayesian Optimization for selecting test vectors to evaluate will be discussed in detail. Without further modification, other techniques for selecting test vectors can be used, such as brute force, human preference, simulated annealing, and random walks. In FIG. 3B the machine learning system selected a test vector for an electronic component (date-lot code 5CAGKYM) based on Batch Bayesian Optimization of the surface of potential test vectors. In this embodiment points chosen by the Bayesian Optimization algorithm are being evaluated by scoring a multiclass classification of a small set of test parts with two date-lot codes. The best evaluated test vector was utilized to create a one class classifier for the electronic component as shown in FIG. 3B. Then, the electronic component (date-lot code 6AAE28M) was classified using that one-class classifier. The relative effectiveness of the classifier can be measured in terms of multiples of the standard deviation of the known good class. As can be seen by a comparison of the one-class classifier in FIG. 3A and FIG. 3B the machine learning system has 20 standard deviation separation while the skilled engineer test vector resulted in a 4 standard deviation separation. Note that while this description is producing one test vector the current embodiment could be generalized to produce a number of test vectors which are then used in aggregation to make a final classification of the components under test. This could be accomplished either by aggregating test results into one object then classifying that object, by utilizing multiple classifiers, by utilizing a meta-classifier or any combination of the above.

Bayesian optimization enables the system to approximate the score of the test vector being selected before evaluating the function by inserting test parts and scoring the test vector. Bayesian optimization is thus particularly appropriate if the function being evaluated is expensive. For example, inserting electronic components in the test socket in order to take measurements and analyze the measurements requires tester time and part fatigue while estimating those results based on past results only requires compute cycles. Bayesian optimization may be conducted in batches and is a mathematical technique for meta-parameter optimization. The goal of the algorithm is estimating the surface value at test points, selecting high value points to test then making more informed decisions about the surface and further selections based on the totality of past results. It is fundamentally a global optimization algorithm and can minimize any function of the surface. One of the most useful functions to minimize is "regret"; this is the predicted score of a point balanced by the prediction accuracy for the predicted score. Minimizing this function effectively minimizes the needed number of tests on the physical equipment. As insertion of components is costly, it is possible to further reduce the number of insertions by batching tests. In batch Bayesian optimization, points are found one at a time as with Bayesian optimization but rather than testing the point immediately the predicted score is added to the surface while adding the uncertainty for that point to a total batch uncertainty. The Bayesian algorithm then is used to find the new predicted minimum regret point in the updated surface. Additional points are generated and added to a test queue in this fashion until either total uncertainty has passed a threshold or a set number of points are in the queue.

Once an appropriate or optimal test vector has been acquired for a particular component or type of component, that test vector can be utilized to train a classifier. Once a classifier is trained, it can be used to determine information about unknown components from an untrusted or unknown source.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

Mathematical terms such as "signal processing", "machine learning", and "classifier" are used to describe mathematical processes and should be interpreted as potentially comprising of one or more steps that can be described as such. For example, applying a Fourier transform then performing principle component analysis to the same data would fall under the description of "signal processing". A null step is a valid step except when necessitated otherwise by use of a result. For example, using the signal processing step of leaving signals in the time domain then directly applying "machine learning" would be covered under the scope of this invention. "Machine learning" and "classifier" can refer to any mathematical learning technique including but not limited to one class classifiers, multi-class classifiers, bagged classifiers, and unsupervised, semi-supervised, or supervised clustering. When referring to "machine learning" or "signal processing" systems the choices of algorithm also need not be fixed. For example a "machine learning system" may use a multi-class support vector machine in one step of a process and the k-nearest neighbors unsupervised clustering algorithm in another step. The number of steps for any iterative process is assumed to be 0 or more, and such processes may be terminated based on any stoppage criteria including number of iterations and algorithms used meeting a threshold. Parameters necessary for algorithms may be changed or re-learned during any step and multiple sets of parameters may be used in any step. For example, when using a bagged classifier approach each of the individual classifiers may learn their own signal processing pipeline.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

The invention claimed is:

1. A method for automated test vector generation comprising:
    selecting a batch of training test vectors with an optimization framework, wherein the optimization framework selects the batch of training test vectors based on one or more previously selected batches of training test vector scores and candidate test vector score approximations;
    installing a training component into an electronic component interface;
    applying the selected batch of training test vectors to the training component;
    sensing, with a sensor, side channel information from the training component for each training test vector of the batch of training test vectors in response to the applying;
    determining a test vector score for each training test vector of the batch of training test vectors based on the side channel information;
    in response to a test vector score threshold or test vector space coverage threshold being met or exceeded, selecting at least one of the one or more training test vectors as a trained test vector set; and
    in response to a test vector score threshold or test vector space coverage threshold not being met or exceeded, performing the selecting, applying, sensing, and determining steps.

2. The method of claim 1 including optimizing soft parameters via machine learning, wherein soft parameters include signal processing and classifier choice.

3. The method of claim 1 wherein the determining includes creating a classifier from the side channel information acrd using the side channel to classify the training component.

4. The method of claim 3 wherein creating the classifier includes at least one of creating the classifier from multiple iterations of sensing side channel information and creating the classifier from transfer learning.

5. The method of claim 3 wherein the selecting includes selecting the hatch of training test vectors based on results from the classifier.

6. The method of claim 1 wherein the selecting includes selecting the batch of training test vectors based on at least one of multiple iterations of sensing side channel information, transfer learning, and metaparameter optimization.

7. The method of claim 1 wherein the training components include one or more devices with one or more known characteristics.

8. The method of claim 1 wherein at least one of the installing, applying, sensing, determining, and selecting, is automated using at least one of programmable test sockets, programmable connections to test sockets, and machinery to insert or remove chips.

9. The method of claim 1 wherein at least a portion of data, metrics, results, and machine learning parameters are processed and stored in the cloud or on a device that is external to the electronic component interface.

10. The method of claim 1 wherein a device with a known property is used to calibrate at least one of the electronic component interface, sensor, and one or more of the training test vectors.

11. The method of claim 10 wherein the calibration process is automated.

12. The method of claim 10 herein machine learning is used to determine at least one of calibration information and process side-channel information from the calibration device.

13. The method of claim 1 where the properties of the training component are unverified and the method includes generating test vectors that either detect outliers or a mathematical property of the training component.

14. An automated system for selecting a trained test vector set comprising:
   an electronic component interface configured for installation of a plurality of training components, wherein the electronic component interface is configured to apply a set of one or more training test vectors to the plurality of training components;
   a sensor configured to sense side channel information from each of the plurality of training components in response to the application of a batch of training test vectors to the training components via the electronic component interface;
   a filtering and learning module configured to:
      create a classifier for each training test vector of the batch of training test vectors based on the side channel information sensed from each of the plurality of training components in response to the application of that training test vector;
      classify each of the plurality of training components with the classifier;
      determine a quality factor of each classifier;
   a machine learning module configured to select the batch of training test vectors with an optimization framework, wherein the optimization framework selects the batch of training test vectors based on the one or more previously selected batches of training test vectors, the quality factor of each classifier created with those training test vectors, and candidate test vector score approximations;
   wherein in response to a quality factor threshold or test vector space coverage threshold not being met or exceeded, the machine learning module is configured to select a different batch of training test vectors with the optimization framework; and
   wherein in response to a quality factor threshold or test vector space coverage threshold being met or exceeded, the automated system is configured to determine a trained test vector set based on the one or more training test vectors of the previously selected batches of training test vectors and the quality factor of each classifier.

15. The system of claim 14 wherein the machine learning module automatically iterates through multiple rounds of test vectors for a set of training devices.

16. The method of claim 1 wherein said applying includes automatically configuring, with an automation framework, the electronic component interface for each training test vector of the batch of training test vectors.

17. The method of claim 1 including:
   providing a global parameter optimization framework to search over a test space with a plurality of parameters; and
   wherein said selecting the batch of training test vectors is based on the global parameter optimization framework and the test vector scores of one or more previously selected batches of training test vectors.

18. The method of claim 1 including automatically recalculating the test vector score for each training test vector of the batch of training test vectors using meta-parameter optimization.

19. The method of claim 18 wherein the optimization framework selects the batch of training test vectors based on said comparing and recalculating steps.

20. The system of claim 14 wherein the trained test vector set is applied to a plurality of electronic components to generate side channel information and classify the plurality of components.

21. The system of claim 14 wherein the plurality of training components are a subset of a plurality of components subject to counterfeit detection with the trained test vector set.

22. The system of claim 14 wherein the set of one or more training test vectors is updated based on side channel information sensed from each of a different plurality of training components with a related device class or property.

23. The system of claim 14 wherein the electronic component interface accepts multiple devices simultaneously.

24. The system of claim 14 wherein the electronic component interface includes a pick and place system.

25. The system of claim 14 wherein the machine learning module is configured to add or remove training components from the plurality of training components to improve the learning rate of the system.

26. The system of claim 14 wherein said electronic component interface is configured for each training test vector according to an automation framework.

27. The system of claim 14 wherein the machine learning module is configured with a global parameter optimization framework to search over a test space with a plurality of parameters to select the batch of training test vectors with the optimization framework, wherein the machine learning module is configured to select the batch of training test vectors based on the global parameter optimization framework and the quality factor each of each classifier of the one or more previously selected batches of training test vectors.

28. The system of claim 14 wherein said filtering and learning module is configured to automatically recalculate the test vector score for each training test vector of the batch of training test vectors using meta-parameter optimization.

29. The system of claim 28 wherein the optimization framework selects the batch of training test vectors based on said recalculations of the filtering and learning module.

* * * * *